May 25, 1937.　　W. TAMMINGA ET AL　　2,081,651
SANITARY LIQUID DISPENSER
Filed May 9, 1935　　4 Sheets-Sheet 4

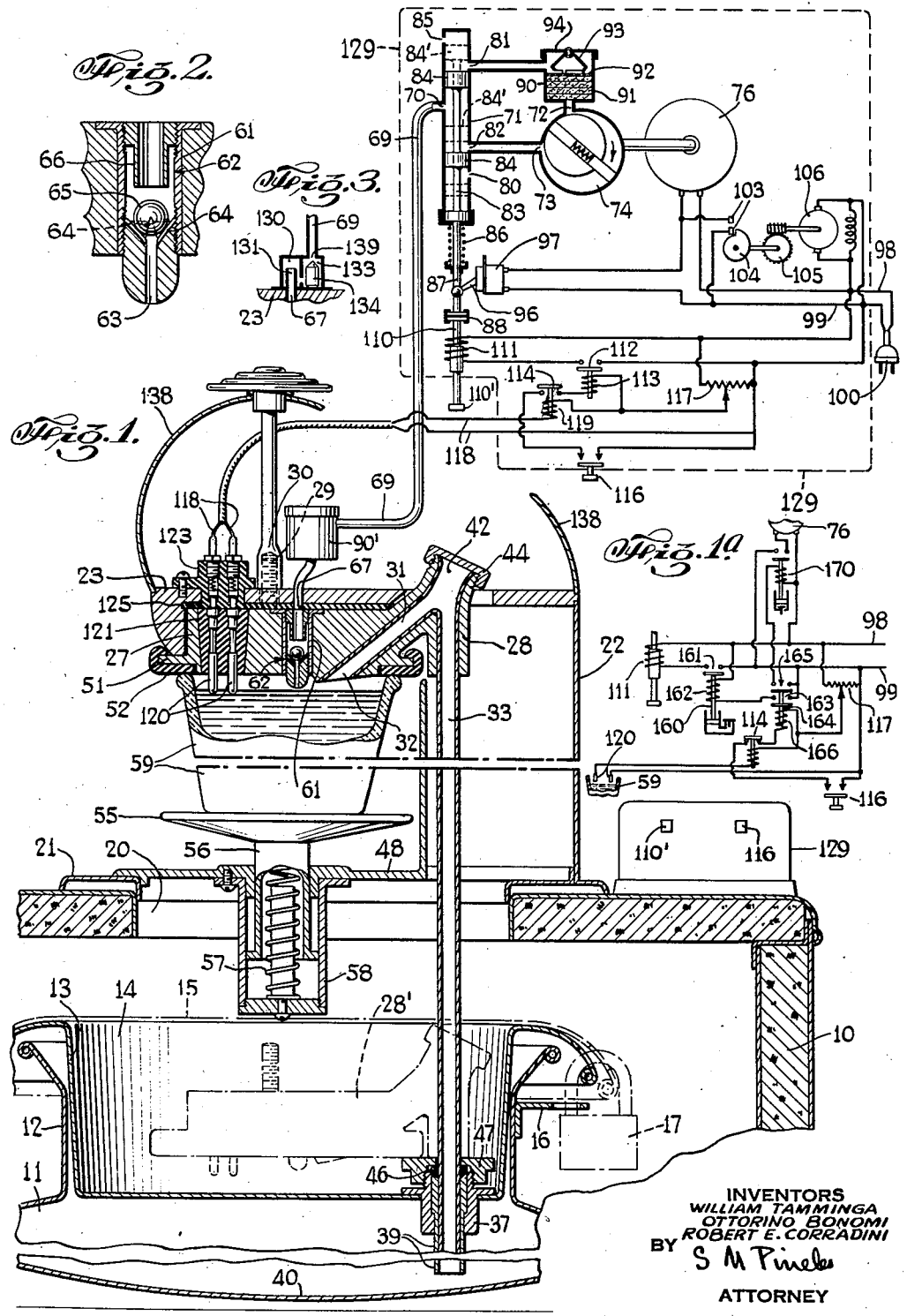

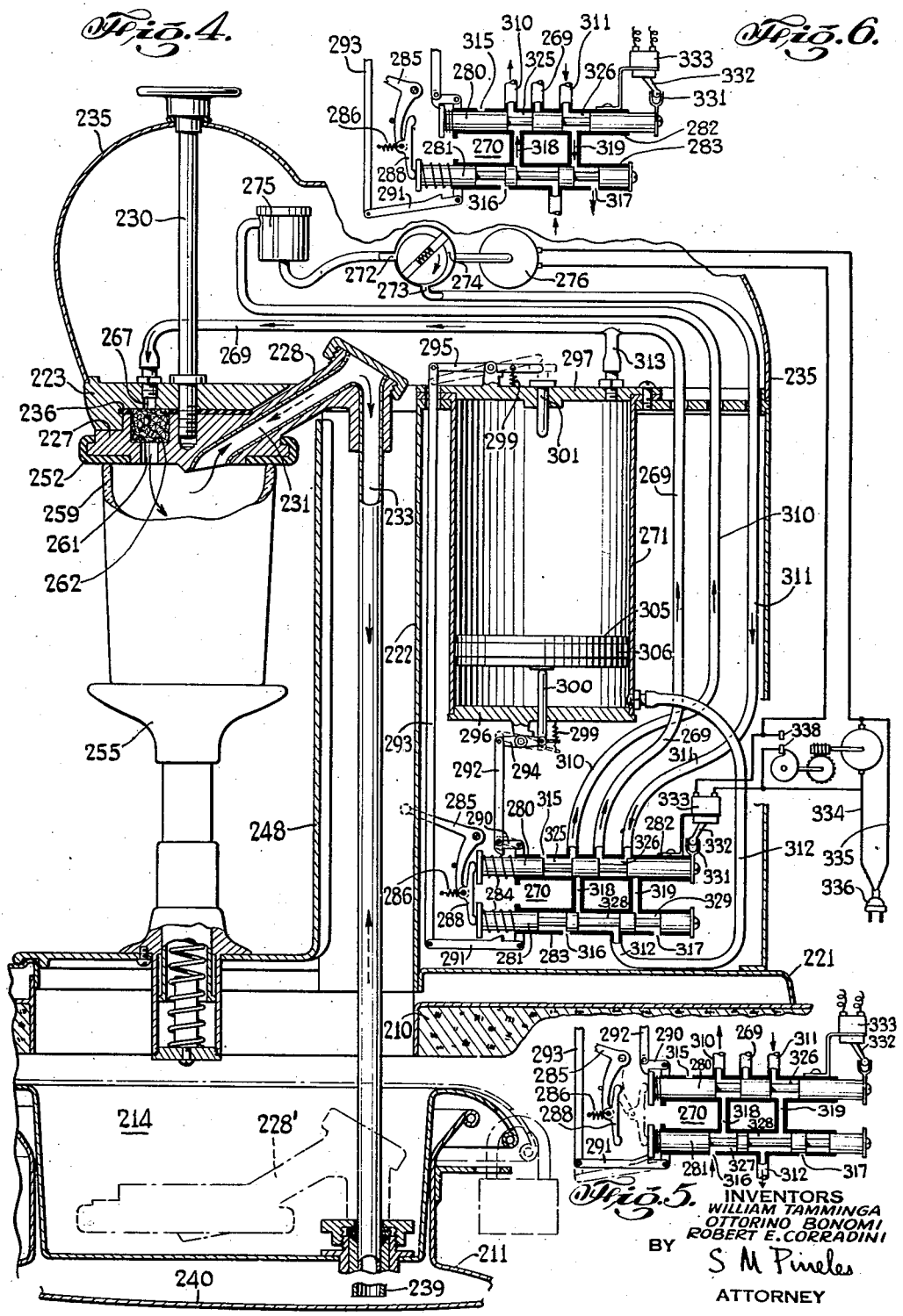

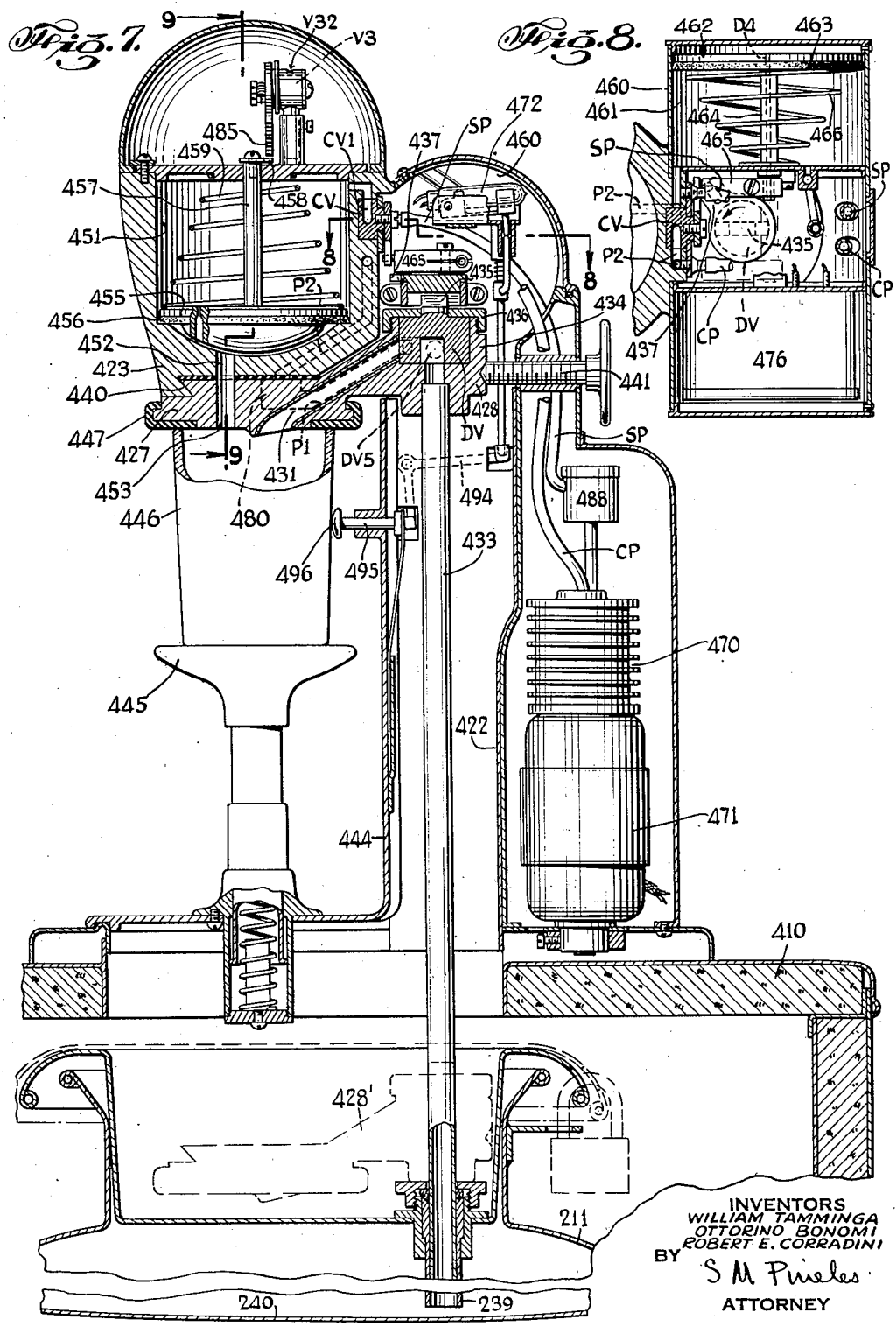

INVENTORS
WILLIAM TAMMINGA
OTTORINO BONOMI
ROBERT E. CORRADINI
BY S M Pineles
ATTORNEY Patented May 25, 1937

2,081,651

UNITED STATES PATENT OFFICE 2,081,651

SANITARY LIQUID DISPENSER

William Tamminga and Ottorino Bonomi, New York, and Robert E. Corradini, Bronx, N. Y.; said Tamminga and said Bonomi assignors to said Corradini Application May 9, 1935, Serial No. 20,578

20 Claims. (Cl. 226—116)

This invention relates to sanitary liquid dispensers and has particular relation to devices for dispensing milk and similar emulsion-like liquids, and this application discloses in part the subject matter disclosed by us in the application Serial No. 4,734 filed February 4, 1935.

It is among the objects of the invention to provide an improved sanitary liquid dispensing device which maintains the liquid stored in a container at uniform consistency and which has simple and readily accessible parts that can be readily maintained in sanitary condition and will prevent contamination or deterioration of the dispensed liquid. A particular object of the invention is a sanitary milk dispensing device.

The foregoing and other objects of the invention will be best understood from the following description of exemplifications thereof, reference being had to the accompanying drawings wherein Fig. 1 is a diagrammatic view, with parts shown in section, illustrating a milk dispensing device exemplifying one embodiment of the invention;

Fig. 1a is a diagram of a modified control circuit for the device of Fig. 1;

Fig. 2 is a sectional view drawn to size of the cut-off valve of Fig. 1;

Fig. 3 is a diagrammatic sectional view of an overflow valve for use in connection with the device of Fig. 1;

Fig. 4 is a diagrammatic view, with parts shown in section, illustrating a milk dispensing device exemplifying another embodiment of the invention;

Figs. 5 and 6 are diagrammatic views showing the positions of the control valve of Fig. 4 in consecutive operating positions;

Fig. 7 is a sectional view illustrating a milk dispensing device exemplifying another embodiment of the invention;

Fig. 8 is a horizontal sectional view of the device along line 8—8 of Fig. 7;

Figure 9:
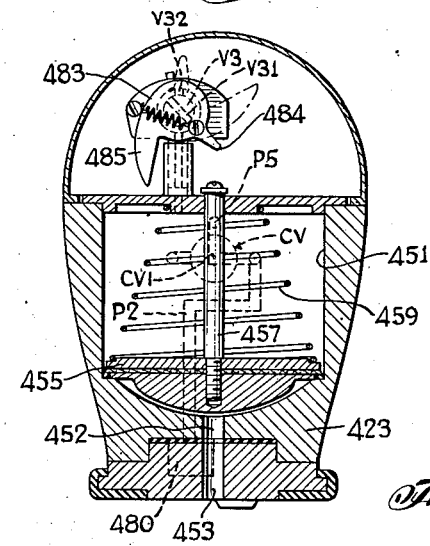
Fig. 9 is a vertical sectional view of the device along line 9—9 of Fig. 7.

Although milk has long been known as a most essential food, little progress has been made in the past in constructing a sanitary milk dispenser because milk is a good breeding substance for bacteria and is an emulsion from which the dispersed cream tends to separate. In order to be satisfactory a milk dispensing device must maintain the dispensed milk at uniform consistency, and must protect the dispensed milk against contamination and deterioration.

The milk dispenser of the present invention overcomes these difficulties. In accordance with the invention, the parts of the milk dispensing device through which the milk flows are simple and easy to clean. Preferably, they are combined as a unit with the can in which the dispensed milk is dispensed. The dispensing device has simple and straight discharge ducts and all its parts are readily accessible for cleaning and scrubbing. In order to dispense the liquid, the dispensing device is withdrawn from the milk can while maintaining its milk discharge duct connected with the bottom portion of the can. In the dispensing position the dispensing device is detachably supported on a dispensing stand by means of which motive power is applied to discharge the milk through a fully protected discharge duct and to maintain the milk in the can in a uniform condition by periodic agitation with highly purified air discharged into the stored milk through the milk discharge duct.

As shown in the exemplification of the invention of Fig. 1, inside a refrigerator casing 10, which is maintained at the proper temperature suitable for conditioning the milk, is stored a milk can 11 of conventional construction having a neck 12 closed with a cover 13 which forms a relatively large compartment 14 which may be in turn enclosed by a second outer cover 15. The two covers may be of the usual construction and are preferably provided with sealing lugs 16 which may be locked and sealed by means of a lock 17 as indicated in the drawings. The outer cover 15 is removed before inserting the can 11 into the refrigerator 10 so as to expose the interior of the cover compartment 14.

The top wall of the refrigerator 10 has a large opening 20 over which is mounted a base plate 21 of a hollow pedestal 22 open on the front side above the refrigerator opening 20, and carrying a supporting plate 23 overhanging the open space above the base plate.

To the underside of the supporting plate 23 is attached the dispensing plate 27 of a dispensing head 28 by means of a screw held by a bolt nut 30. The dispensing head 28 is provided with an inclined discharge duct 31 terminating in a discharge opening 32 on the underside of the dispensing plate 27 and an adjoining vertical discharge duct 33 slidably movable through a connecting bushing 37 of the inner cover 13 which carries an adjoining downwardly extending outer tube 39 reaching to near the bottom 40 of the can 11. The two discharge ducts 31 and 33 are straight and have at their upper junction a cleaning port 42 which is closed by a readily removable cover 44 to permit easy cleaning of the two straight discharge ducts 31, 33 of the dispensing head. The front side of the pedestal 22 and the portion of the base plate 21 underlying the dispensing plate 27 have suitable openings for permitting movement of the dispensing head 28 from the position in engagement with the supporting plate 23 as shown in full lines, to the dotted line position 28' in the compartment 14 of the cover, while the discharge duct 33 slides downwardly through the outer tube 39 into the interior of the milk can 11.

The dispensing head 28 may be quickly detached from the supporting plate 23 by unscrewing the nut bolt 30 and pushing the dispensing head 28 to the dotted line position 28', or moved from the dotted line position 28' within the cover to its position in engagement with the supporting plate 23. The discharge duct 33 may be locked and sealed in its operating position by a packing ring 46 and a threaded lock cap 47.

The underside of the dispensing plate 27 has an annular recessed face portion 51 covered by a sealing ring 52 of suitable material, such as rubber, forming on the underside a seat for the vessels that are to be filled with milk. Under normal operating conditions the open space on the front side of the pedestal is covered by a removable cover 48 enclosing the interior of the refrigerator and the adjoining hollow space of the pedestal 22.

On the portion of the pedestal cover underlying the sealing ring 52 is mounted a vessel holder 55 which is carried by a tube 56 that is pressed upwardly by a helical spring 57 held in place by an enclosure 58. A receiving vessel, such as a glass 59, which is to be filled with milk is placed on the holder 55 which presses the upper edge of the vessel into sealing engagement with the sealing ring 52, the vertical movement of the holder 55 making it possible to dispense milk into receiving vessels of different lengths.

In the central portion of the dispensing plate 27 is provided a suction aperture 61 in which may be mounted a cut-off valve 62 shown in detail in Fig. 2. The cut-off valve is shown in the form of a tubular casing having an overlapping flange fitting into the aperture 61 of the dispensing plate and provided at its lower end with an air nozzle 63 having at its upper end upwardly projecting ridges 64 supporting a loose valve ball 65 for closing the lower opening of an air inlet tube 66 mounted in the upper end of the valve casing 62 if the ball 65 is lifted from its support by a drop of liquid drawn up by suction acting through air inlet tube 66. To an opening 67 on the supporting plate 23 above the suction aperture 61 is connected an air pipe 69, leading to an opening 70 of a control valve 71, by means of which the air pipe 69 may be connected either to the suction opening 72 or the compression opening 73 of a rotary air pump 74 driven in the direction indicated by the arrow by an electric motor 76.

The control valve 71 may be made in the form of a small tubular casing with an exhaust opening 80 and suction openings 81, 82 which are controlled by a valve slide 83 provided with control pistons 84 which may be moved from the full line position as shown in the drawings to the upward dotted line position 84' by pressing its actuating rod 87 with the button 88 against the action of the spring 86 which holds the valve slide 83 in its lower normal position.

In the connection between the suction inlet 81 of the control valve 71 and the suction inlet 72 of the pump 74 is included an air filter 90 for cleaning all the air entering into the suction pump 74 so that only air free from dust passes through the pump. A similar air filter 90' may be included in the air pipe 69 leading from control valve 71 for subjecting all the air entering into the dispenser to a second filtering operation. The air filter 90, like the filter 90', consists of a compartment enclosing a plurality of layers of filter texture 91 held in place by a perforated sheet 92 and a conical air guide 93 secured to a detachable cover 94 of the compartment. Air entering from the valve opening 81 into the filtering compartment 90 is distributed by the guide 93 and flows by way of the perforations of the sheet 92 through the layers of the filter texture 91 into the inlet of the suction pump 74.

To the actuating rod 87 of the control valve is connected, as by means of a swivel joint, the actuating lever 96 of a toggle switch 97 for controlling the energization of the electric motor 76 from the two supply line conductors 98, 99 connected to a conventional domestic electric-current supply plug 100. When the switch lever 96 is in its downward position as shown in the drawings, the motor circuit is open and the motor does not operate. When the button of control rod 87 is pushed upwardly against the action of the spring 86, the switch lever 96 moves with the rod and closes the circuit, energizing the motor 76 and causing it to operate the pump while the valve slider 83 and the two valve pistons are in the dotted line position 84'. As soon as the slider 83 is released, it is instantaneously returned to its downward position by the action of the spring 86 and the toggle switch 97 de-energizes the motor 76, and the momentum of the rotating masses of the motor and pump continues to drive the pump for a short period causing the pump to discharge compressed air through the milk ducts 31, 33 before the pump stops.

In accordance with the invention, the pump motor 76 has an additional energizing circuit from the supply line conductors 98 and 99 which is completed by two contacts 103, which are periodically closed by any suitable device, for instance, by a cam 104 driven through a speed reduction gearing 105 with a small constant speed motor 106 that is continuously energized from the two supply line conductors 98, 99, or any other clock-like device. In the preferred arrangement of the invention, the periodical closure of the contacts 103 is controlled to complete the motor circuit about once every 5 or 6 minutes and maintain the motor in energized condition for about 10 seconds every 5 or 6 minutes, causing the air pump 74 to operate for about 10 seconds every 5 or 6 minutes.

The slider 83 of the control valve 71 with the motor control switch 97 may be actuated either manually by pressing against the button 88 of the actuating rod 87, or by an electro-magnetic valve relay 110 which has an actuating coil 111 that may be energized from the line conductors 98, 99 by a dispensing relay 112 having normally open contacts. The dispensing relay 112 is actuated to close its contacts upon energization of its actuating coil 113 over the normally closed contacts of a lock-out relay 114 and the normally open contacts of the dispensing switch 116 through the low voltage end of a potentiometer 117, the ends of which are connected to the two electric supply line conductors 98, 99. Once the dispensing switch 116 is closed, an energizing circuit is established through the actuating coil 113 of the dispensing relay 112 closing the energizing circuit of the actuating coil 111 of the valve relay 110 and instantaneously moving the slider 83 with its control piston 84 to the upper dotted line position 84'. On releasing and opening the dispensing switch 116 the actuating coil 111 of the valve relay 110 is deenergized and the valve slider 83 is instantaneously returned by the action of the spring 86 to its normal downward position.

While the dispensing switch 116 is closed, the energizing circuit of the dispensing relay winding 113 will be independently de-energized by a lock-out circuit formed of the conductors 118 energized by the potentiometer 117 and leading by way of the actuating winding 119 of the lock-out relay 114 to two immersion electrodes 120 mounted in an electrode insert 121 of insulating material, such as synthetic resin, which fits into a hole in the dispensing plate 27. The two conductors 118 leading to the immersion electrodes 120 may form a cord terminating into a detachable plug 123 fitting into a suitable socket opening in the supporting plate 23 of the pedestal and having resiliently pressing contacts for establishing circuit connections to the electrodes 120. A gasket 125, of suitable packing material, such as rubber, interposed between the facing surfaces of the dispensing head 27 and the supporting plate 23 prevents air leakage between the junction surfaces.

The lower ends of the two immersion electrodes 120 project to a level somewhat below the downward level of the nozzle 63 of the cut-off valve 62 so that milk discharged into the glass 59 reaches the level of the two electrodes 120 and establishes an electrically conducting connection therebetween before it reaches the lower end of the cut-off valve 62.

The pump with its driving motor, control valve and associated elements are mounted in a casing 129 provided on the top of the refrigerator box 10. The several parts are preferably so mounted in the casing 129 that an actuating button 110' provided on the valve relay for mechanically actuating the slider of the control valve 71 as well as the actuating member of the dispensing switch 116 are accessible from the exterior of the casing 129, as indicated in Fig. 1.

The parts mounted on the top of the supporting plate 23 are enclosed by a cover 138 held in place by means of the screw bolt 30 with which the dispensing head is attached to the supporting plate, and the pipe as well as the conductors interconnecting the dispensing head and the control mechanism are suitably mounted within the enclosures.

Under normal operating conditions the several parts are arranged in the way shown in Fig. 1. The can 11 with the milk is enclosed in the refrigerator 10 and is maintained at the proper temperature. The circuit of the motor 76 is open at the time-controlled contacts 115 and at the valve-controlled toggle switch 97.

If no dispensing operation is initiated, the continuously energized motor 106 will periodically complete one rotation of the cam 104 at the end of a predetermined time setting, for instance, after each 5 or 6 minutes, and close the contacts 103 for about 10 to 15 seconds. This causes periodical energization of the motor for about 10 seconds every 5 or 6 minutes causing the pump 74 to draw in air by way of the openings 85, 81 of the control valve, the air filter 90 and the pump inlet 72, and discharge compressed air through the pump outlet 73 over openings 82, 70 of the control valve 71, through the air pipe 69, the passages of cut-off valve 62, into the space enclosed by the glass 59, and therefrom by way of milk discharge ducts 31 and 33 to the bottom of the milk can 11, stirring up the milk and agitating it as the released air bubbles through the milk, maintaining the milk in an emulsified state and of uniform consistency.

Tests have shown that by discharging compressed air every 5 or 6 minutes for periods of about 10 seconds into the space near the bottom of a can holding milk, the milk throughout the entire can will remain of uniform consistency. Tests have also shown that the condition of the milk will not in any way be affected by the discharge of compressed air from the pump into the milk if the air discharged into the milk is passed through a filter which frees the air from dust.

Filtration of all the air discharged into the milk is secured by the filter 90 placed in front of the suction inlet of the pump. In a dispensing device of the type described herein used in connection with a milk can about 2 feet high and holding about 10 gallons of milk and an air pump adjusted to produce a suction pressure corresponding to several inches of mercury sufficient to lift the milk into the discharge vessel, the air pump may be arranged to deliver the agitating air at an average rate of about ½ cubic foot per minute. The filter 90 used in connection with the device described above contains several layers of fluffy cotton texture forming a filter body about ½ inch high, the filter layers consisting of standard commercially available filtering textures for air cleaning purposes.

Milk subjected to periodic agitation by air passed through a filter described above retains its highly sanitary condition in which it is originally placed in the can. A second similar filter 90' may be connected in the air pipe 69 leading to the dispenser immediately in front of its connection to the space within the vessel below the dispensing head.

By periodically repeating the agitation the milk is maintained at a uniform consistency ready for dispensing. Throughout the operation of the device some standby vessel, such as glass 59, is held on the seat 55 and pressed with its upper edge against the sealing ring 52 to provide a passage for the compressed agitating air periodically delivered by the pump 74 to the milk discharge ducts 31 and 33 leading into the bottom of the milk can in the way described above.

Milk may be dispensed at any time into the standby vessel 57 or any other vessel on seat 55, and held by the seat against the sealing ring 52 in the way shown in Fig. 1.

To discharge milk from the can into the vessel 57, the dispensing switch is closed, energizing the winding 113 of the actuating relay causing in turn instantaneous energization of the actuating winding 111 of the valve relay 110 which actuates the valve slider 83 and moves the slider pistons into the dotted line positions 84'. In this position the control valve 71 provides a suction passage from the suction inlet 72 of the pump by way of the filter 90, valve openings 81, 76, air pipe 69, the cut-off valve 62, and by way of the vessel 59 to the space of the milk discharge ducts 31, 33 leading to the bottom of the milk can, and an exhaust passage from the exhaust opening 73 of the pump through valve openings 82, 80 to the atmosphere. The suction of the pump acting on the milk discharge ducts 31 and 33 exercises a suction force lifting the milk from the can into the discharge duct 31 and produces an instantaneous flow of milk through the discharge opening 32 into the vessel 59. The flow of milk may be instantaneously stopped when the milk in the vessel 59 reaches the desired level as seen by the operator through the glass vessel 59 by releasing the actuating switch 116. This brings about instantaneous return of the valve slider 83 to its downward position, cutting off the suction, stopping the milk flow into the vessel, and discharging for a short period compressed air while the pump stops running.

The milk dispenser will automatically cut off the flow of milk by the action of the suction pump when a dispensing operation has been started, while the dispensing switch 116 is held closed if the milk reaches the level of the lower ends of the immersion electrodes 120, thereby completing the energizing circuit for the actuating winding 119 of the lock-out relay 114 in the energizing circuit of the dispensing relay 113. This causes instantaneous opening of the contacts of relay 112 deenergizing the circuit of the valve relay 110 and brings about instantaneous return of the valve slider 83 to the downward position and instantaneously stopping the flow of milk, as described above.

Milk may also be dispensed into a vessel held on the seat 55 in the way shown in Fig. 1, by direct manual actuation of the valve slider by pressing the button 88 of the slider actuating rod 87 or the button 110' of the valve relay 100. This brings the control pistons 84 of the slider valve 83 to the upper dotted line positions 84', thereby connecting the suction end of the pump 72 with the milk discharge ducts 31, 33 of the dispenser head. Like in the operation described above, the suction of the pump produces a suction force lifting the milk through the milk ducts 39, 33, into the discharge duct 31, and causes the milk to flow through the discharge opening 32 into the vessel 59. The flow of milk may be stopped at any instant when the milk in the vessel has reached the desired level as seen through the glass walls thereof by releasing the push button 88 of the control valves 71 which instantaneously stops the flow of the liquid and stops the motor 76 as described above.

The flow of the liquid under the action of the suction pump will also automatically be cut off while the push button 88 of the slider valve holds the control pistons 84 of the slider valve 83 in the upper positions 84' if the milk flowing into the vessel reaches the level of the lower end of the nozzle duct 63 of the cut-off valve 62 shown in detail in Fig. 2. A tiny bit of milk reaching the lower level of the nozzle ducts 63 will be instantaneously lifted through the duct by the suction force exercised in the space above the duct and acquire sufficient velocity to impel the solid ball valve 65 resting on the projections of the upper end of the nozzle duct 63 to the lower opening of the air inlet tube 66 of the cut-off valve where it is held in place by the suction exercised on the space above the ball valve and held in place, cutting off the suction from the space below the ball and stopping the further flow of the milk into the vessel. The filled vessel may then be removed from its seat and the suction as well as the motor may be cut off by releasing the valve slider 83. The return of the valve slider 83 to its normal lower position removes the suction from the air pipe 69 and releases the ball valve 65 which returns to its lower seat, and any small quantity of milk that has gotten into the space above the nozzle duct will flow down into the vessel placed on the seat below it.

The dispenser shown in Fig. 1 with the electrical control circuit, including the dispensing switch 116, may be operated without the cut-off valve 62. In such arrangement entrance of milk into the air pipe 69 may be prevented by connecting between the air tube 69 and its connection to the opening 67 in the supporting plate 23 a cut-off float valve shown in Fig. 3 comprising an overflow chamber 130 connected through an overflow tube 131 to the opening 67 of the supporting plate 23, the overflow chamber being connected to a float chamber 133 having an opening 139 to which is connected the air pipe 69. The float chamber 133 is provided with a float 134 which normally rests on the bottom of the chamber permitting in this normal position unobstructed flow of air between the dispenser passages and the air tube 69. The float 134 is positioned to cause milk entering through the tube 131 into the float chamber 130 to lift the float and seal up the opening 139 leading to the air pipe 69, thereby preventing milk from entering into the air pipe and also cutting off the suction from the dispenser passages. If, through some inadvertence, the milk flow is not stopped and continues to rise so that it reaches the overflow chamber 130, the float 134 will be lifted and close the opening 139 leading to the air tube, thereby stopping the suction and preventing the further flow of milk. Damage to the dispensing device and its parts is thus prevented and any accidental trouble may be readily removed without impairing the operativeness of the device.

Each dispensing operation of the device shown in Fig. 1 may be combined with a pre-agitation operation by controlling valve 71 and pump motor 108 in the way shown in Fig. 1a. Winding 111 of the valve relay 110 is energized by an instantaneously opening relay 160 which closes its contacts 161 after a predetermined delay upon energization of its actuating winding 162 by normally open contacts 163 of an instantaneously acting master relay 164, which has a second set of normally open contacts 165 for energizing the pump motor 76. The master relay 164 will instantaneously close its contact sets 163, 165 upon energization of its actuating coil 166 over closed contacts of the lock-out relay 114 and the open contacts of the dispensing switch 116 connected to the potentiometer 117 like in Fig. 1. Closure of the dispensing switch 116 instantaneously actuates the master relay 164 to close its two contact sets 163, 165. The motor starts and the pump discharges compressed agitating air into the milk, pre-agitating the milk for a short time until the time-delay relay 160 closes its contacts 161 to energize the valve relay coil 111 bringing the valve slider to the position in which the motor driven pump lifts the milk from the can to the receiving vessel.

In a similar way compressed air will be discharged into the milk immediately after the end of a dispensing operation by connecting between the master relay contacts 165 and the motor energizing circuit an auxiliary relay 170, like relay 160, which instantaneously closes the motor circuit upon closure of the master relay contacts 165, and has a predetermined time delay in opening the motor circuit upon opening of the master relay contacts 165 causing the pump to discharge compressed air through the milk passages for a predetermined short time without depending on the driving energy of the momentum of the rotating masses of the motor and pump for such action.

In the milk dispensing device described above, all milk ducts are simple, straight and easy to clean. The parts with which the milk may come into contact are a part of the milk can and are returned with the milk can for cleaning in the same way as the milk can is cleaned. All parts of the milk dispensing device which may affect the condition of the milk are thus readily accessible assuring maintenance of all the surfaces that come in contact with the milk in a highly sanitary condition. The dispensing device is operated by gaseous pressure means in the form of an air pump which may serve to compress air as well as to produce a partial vacuum or suck air. The air pump is driven by an electric motor which is operated by control means, including a valve unit and other accessories, for periodically discharging compressed air through the milk discharge ducts of the dispensing head into the milk for maintaining the milk at uniform consistency, and make sure that milk of the same consistency is dispensed from the can irrespective of its level in the can. Deterioration of the milk and its sanitary condition is secured by providing at the suction inlet of the air pump an air filter for freeing the air used in agitating the milk from impurities and accidental contamination that might affect it.

The air pressure and control means effect controlled dispensing of milk from the can into a vessel by applying motive power supplied by the air pressure means for lifting the milk through the protected milk discharge duct from the interior of the can into the readily removable vessel. The control means operate to stop the flow of milk at any desired level or at a predetermined stage of the flow, by mechanical as well as electrical flow cut-off means. The various elements of the device are safe-guarded against accidental faults, and prevent overflow of the milk from the can in case an element becomes defective. All the parts of the device are readily accessible and are easy to assemble and operate.

In Fig. 4 is shown an exemplification of a milk dispensing device embodying another form of the invention. It comprises a refrigerator 210, a milk can 211, a milk dispensing head 228 with a milk dispensing plate 227 and milk discharge ducts 231, 233 constructed, arranged and cooperating like the corresponding parts of the device of Fig. 1. In a similar way the opening on the top of the refrigerator 210 is enclosed by a base plate 221 of a hollow pedestal 222 carrying a supporting plate 223. To the underside of the supporting plate 223 is attached the dispensing plate 227 of the dispensing head 228 by a screw bolt 230, which also holds in place the cover 235 enclosing the space on the top of the supporting plate, a sealing gasket 236 being interposed at the junction surface. The hollow front space of the pedestal 222 is enclosed by a removable cover 248 which carries a vessel holder 255 by means of which a milk receiving vessel, such as a glass 259, is held pressed against a sealing ring 252 attached to the dispensing plate 227 like in Fig. 1. The dispensing plate 227 is provided with an air passage 261 which forms at its upper end a filter compartment 262 holding filter texture like that used in the filters 90 of Fig. 1.

To an opening 267 on the supporting plate 223 above the air passage 261 of the dispensing plate is connected the end of an air pipe 269 leading to a control unit 270 by means of which interconnections are established to a suction cylinder 271, as well as the suction inlet 272 and the suction outlet 273 of a rotary air pump 274 driven by an electric motor 276 in the direction indicated by the arrow.

The control unit has a dispensing slider valve 280 and a pre-agitation slider valve 281 movable in valve casings 282, 283, respectively, the valve sliders being normally held in outward position as shown in Fig. 4 by helical springs 284 like the valve slider 83 of Fig. 1. A bell crank lever 285 having an actuating arm projecting from the pedestal compartment to be accessible to the operator, and held in the position shown in Fig. 4 by a spring 286, serves to push by means of an arm 288 the two valve sliders 280, 281 to the position shown in Fig. 5 where they are caught by pawls 290, 291 that are actuated through link rods 292, 293 by lever arms 294, 295 pivotally mounted on the end walls 296, 297 of a suction cylinder 271 that is attached to the supporting plate 223. The arms 294 and 295 are held in place by springs 299 and may be actuated by the tappet rods 300 and 301 to unlatch through link rods 292, 293 the valve sliders 280 and 281, respectively, to permit the valve sliders 280, 281 to return from the position in which they are shown in Fig. 5 to positions shown in Fig. 6 and Fig. 4.

Inside the suction cylinder 271 is mounted a movable piston 305 provided with a sealing ring 306 of flexible material, such as leather. Under the action of air pressure the piston may be moved in the upward direction to actuate the upper tappet rod 301 and unlatch the valve slider 281 bringing the two valves from the position shown in Fig. 5 to the position shown in Fig. 6, or in downward direction to actuate tappet rod 300 and unlatch the valve slider 281 permitting it to return from the positions shown in Fig. 5 or 6 to the outward position of Fig. 4.

The air pump 274 has its suction opening 272 and its compression opening 273 connected by air pipes 310 and 311 to openings in the valve casing 282. The other valve casing 283 is connected through an air pipe 312 to the downward space of the suction cylinder 271. A branch pipe 313 connects the upper space of the suction cylinder 271 to the air pipe 269 leading from the valve casing 282 to the dispenser head.

Valve casing 282 has an inlet opening 315 and valve casing 283 has two inlet openings 316, 317, the two casings being interconnected by passages 318 and 319. The valve slider 280 is provided with a fork member 331 engaging an actuating lever 332 of a toggle switch 333 for controlling the energization of the electric motor 276 from the two supply line conductors 334, 335 connected to a conventional domestic electric supply plug 336. When the valve slider is in the outward position shown in Fig. 4, the switch is open and the motor is de-energized. When the slider is in the inward position shown in Figs. 5 and 6, the toggle switch 333 is closed causing the motor to operate. As soon as the valve slider 280 returns to its outward position under the action of its helical spring 284, the toggle switch 333 deenergizes the motor 276 and the momentum of the rotating masses of the rotor and pump continue for a short time to drive the pump as in the arrangement of Fig. 1. The motor is also provided with a pair of contacts 338 which are periodically closed every 5 or 6 minutes for about 10 seconds to operate the pump 274 for about 10 seconds every 5 or 6 minutes like in the device of Fig. 1.

To establish interconnections between the various passages and openings, the valve slider 280 is provided with channels 325, 326 and the valve slider 281 is provided with channels 327, 328 and 329 providing bridging passages between the various openings and the pipe connected to the valve casings 282, 283.

Under normal operating conditions the several parts are arranged in the way shown in Fig. 4 and the circuit of the pump motor 276 is open at the contacts of the toggle switch 333 and at the periodically actuated contacts 338. The contacts 338 are periodically closed after each 5 or 6 minutes and maintained closed for about 10 or 15 seconds. This causes periodical energization of the motor 276 and periodical operation of the pump 274 for about 10 seconds every 5 or 6 minutes. Each time the pump operates it draws in air by way of inlet opening 315 of valve casing 282 through channel 325, air pipe 310, by way of the filter 275 and the suction inlet 272, into the pump 274, the pump compressing the received clean air and discharges it under pressure through pump outlet 273, air pipe 311, valve slide channel 326, air pipe 269, through the supporting plate opening 267, filter compartment 262, passage 261, through the sealed space within the standby vessel 259, by way of the milk discharge ducts 231, 233 to the bottom of the can 211, stirring up the milk and agitating it as in the device of Fig. 1. This agitation is periodically repeated so that at all times the milk in the can is maintained at uniform consistency.

To dispense milk from the can into a vessel 259 placed on the vessel holder 255 and held in engagement with the sealing ring 252, the actuating button 286 of the valve lever 285 is pressed down bringing the two valve sliders 280, 281 from the position in Fig. 1 to the position in Fig. 5 where they are locked by the pawls 290, 291. The instant the two valve sliders are brought to the inward position shown in Fig. 5, the toggle switch 333 energizes the pump motor 276, setting into operation the air pump 274. Air is sucked into the pump inlet 272 by way of inlet 316 of valve casing 281 through valve passages 327, 318, 325, air pipe 310 and air filter 275, the air being compressed and discharged by way of pump outlet 273 through pipe 311, valve passages 326, 319, 328, air pipe 312, into the bottom end of air cylinder 271, driving the piston 306 in upward direction to compress and discharge the air from the space above the piston through the portion of air pipe 269 over dispenser head passage 261, the space of the vessel 259 into the milk discharge ducts 233 driving any milk within the tube 239 immersed in the can to the bottom of the can, a part of the displaced air bubbling through the milk and agitating it in advance of each dispensing action.

The level of the milk in the tube 239 is thus at the lower end of the tube 239, which is the starting point for the flow of the milk in the immediately following dispensing action which is brought about at the moment when the upward movement of the piston 305 reaches a point where it lifts the tappet rod 301 from its normal position, tripping through link 293 the pawl arm 291 and releasing the valve slider 281 from its inward position, establishing the slider positions shown in Fig. 6. In the new valve position, the pump 274 sucks air into the pump inlet 272 from the space in cylinder 271 on the bottom of the piston 305 through pipe 312, valve passages 328, 318, 325, air pipe 310, filter 275, the air being discharged from the pump by way of the pump outlet 273, through air pipe 311, valve passages 326, 319, 329, over the outlet 317 into the atmosphere. Since the valve end of air pipe 269 is now closed by the valve slider 280, and the piston 305 in the air cylinder 271 is pulled in downward direction by the suction from the pump, the space of the cylinder 271 above the piston exercises through air pipe 269, dispensing plate passage 261, and the space of the vessel 259, a suction force lifting the milk from the starting point at the bottom end of tube 239 into the discharge ducts 233, 231 and discharging the milk into the vessel 259. The flow of milk from the can 211 into the vessel 259 continues until the piston 305 reaches the tappet rod 300 and pushes it downward, releasing the valve slider 280 from the position in which it is shown in Fig. 6. Thereupon, the slider 280 is instantaneously returned to its normal position shown in Fig. 4, reestablishing the normal air connections for periodical agitation, and opening at the switch 333 the energizing circuit of the motor like in the device of Fig. 1. In this way any desired amount of milk may be withdrawn from the can 211 and discharged into the milk receiving vessel 259, the amount of milk discharged into the vessel being determined by the travel of the piston 305 in the suction cylinder 271. By varying the length of the tappet rods 300 and 301, the length of travel of the piston can be varied to discharge any desired predetermined amount of milk into the vessel. Thus by using tappet rods of different lengths, either a pint of milk or a quart of milk may be delivered to the receiving vessel during each dispensing action.

Another exemplification of a milk dispensing device embodying the invention is shown in Figs. 7 to 11. It comprises a refrigerator 410, a milk can 211 and a milk dispensing head 428 with a milk dispensing plate 427 and milk discharge ducts 431, 433 similar to the corresponding parts of the dispenser shown in Fig. 4.

Figure 10:
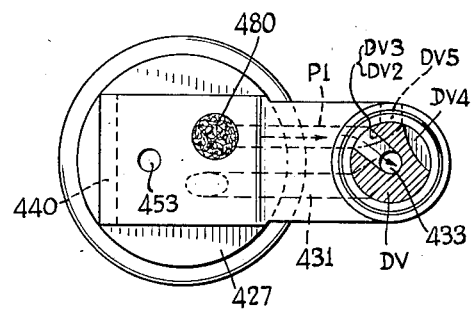
Fig. 10 is a plan view of the dispensing head with the dispensing valve shown in horizontal cross section.

The two milk discharge ducts 431 and 433 are joined by a simple cylindrical valve DV rotatable in a cylindrical valve casing 434 by an upwardly projecting key 435 and enclosed by a cap 436. As shown in Fig. 10, and diagrammatically in Fig. 11, the valve DV has three channels DV2, DV3, DV4 and an air vent DV5 and may be rotated by a forked arm 437 engaging the key 435 to establish various connections described hereinafter.

Like in the device of Fig. 4, a pedestal 422 mounted on the top of the refrigerator 410 carries a supporting member 423 which holds the dispensing plate 427 by interlocking wedge-like ridges 440 and a screw 441. The open front space of the pedestal 422 is enclosed by a cover 444 having a vessel holder 445 for holding a vessel 446 against a sealing ring 447 attached to the underside of the dispensing plate 427.

The upper portion of the supporting member 423 forms a suction cylinder 451, the lower end of which has an opening 452 into a suction passage 453 of the dispensing plate 427. Inside the suction cylinder 451 is mounted a suction piston 455 provided with a sealing ring 456. The piston carries a tripping rod 457 having a tripping pin 458 and is held in the downward position by a helical spring 459.

In a housing 460 on the rear of the supporting member 423 is provided a control cylinder 461 with a control piston 462 having a sealing ring 463 and a control rod 464 carrying an arm 465. A helical spring 466 holds the piston in the position shown in Fig. 8.

In the rear wall of the suction cylinder 451 is mounted a rotary control valve CV which is rotated by a forked arm 469. The valve has a channel CV1 for establishing various connections depending on the angular position of the valve.

In a compartment formed by the pedestal is mounted an air pump 470 which is rotated in the direction of the arrow by an electric motor 471 which is energized from two supply line conductors 473 connected to a conventional domestic electric supply plug either by a dispensing switch 472 or a pair of periodically closed contacts 475 actuated by a clock-like mechanism 476, like the prior arrangements. This clock-like mechanism 476 may be housed in the cylindrical pedestal compartment adjoining the control cylinder, as shown in Fig. 8.

Figure 11:
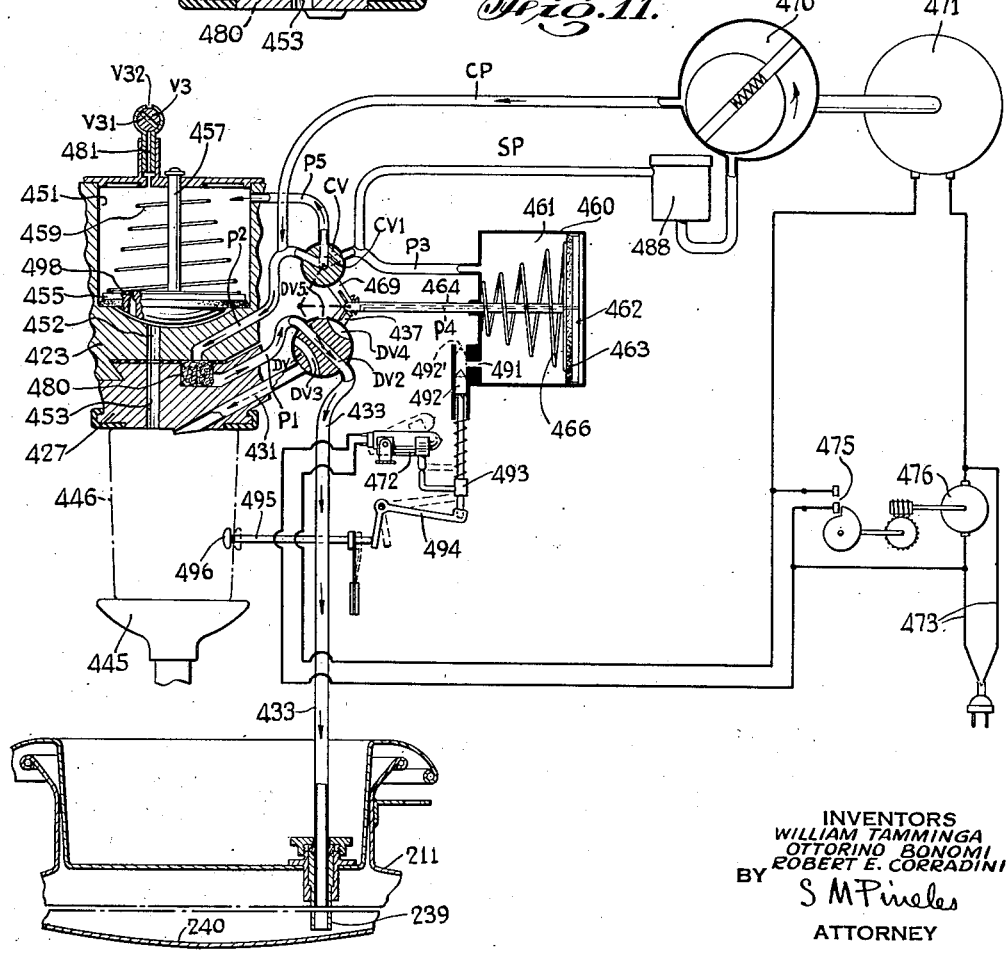
Fig. 11 is a diagrammatic view of the device of Fig. 7.

The air pump 470, the dispensing valve DV, the control valve CV, the suction piston 451, the control piston 461 and the milk discharge ducts 431, 433 are interconnected by passages through the valve channels, tubes and pipes in the way shown diagrammatically in Fig. 11 and the corresponding parts of Figs. 7 to 10. The milk duct 433 is connected by the valve passage DV2 of the control valve DV and the air passage P1 through the dispensing plate to a filter compartment 480 provided in the top of the dispensing plate and holding a suitable air filtering texture. The filter compartment 480 is in turn connected through a passage P2 in the supporting member 423 to the compression valve CV which establishes by the channel CV1 communication with the passage P5 leading to the upper space in the suction cylinder 451.

The top of the suction cylinder 451 is provided with a vent 481 terminating into a vent valve V3 having an air assage V31 and outlet oening V32. The valve V3 is operated by a feed by an off-center spring either in the full line position or in the dotted line position shown in Fig. 9, and has a projecting arm 484 that is engaged by the pin 458 of the piston rod 457 during its upward movement to instantaneously swing the valve V3 to the position in which passage 481 is open to the atmosphere through the aligned valve passage V31 and valve outlet opening V32; and a projecting arm 485 that is engaged by rod pin 458 on its downward movement to swing the cam 483 to its downward position shown in Fig. 9 and in Fig. 11 in which the vent passage 481 is closed.

The connecting passage between the filter compartment 480 in the dispensing plate and the control valve CV is connected through an air pipe CP to the compression end of the air pump 470 for admitting compressed air delivered by the pump 470 through air pipe CP, passage P2, filter compartment 480, passage P1, control valve channel DV2 into the milk duct 433, and therethrough to the bottom of the milk can for agitating the milk in the can and maintaining the milk at uniform consistency. When the control valve CV is rotated by its arm 469 in clockwise direction, it is brought to a position where its valve channel CV1 interconnects the passage P3 connected to the air space in the control cylinder 461, with the passage P5 leading to the air space on the top of the suction cylinder 451.

In a similar way the valve DV when rotated by its arm 437 in counterclockwise direction establishes through its passage DV3 a connection between the discharge ducts 431, 433 and permits flow of milk from the bottom of the milk can through tube 439 and discharge ducts 433 and 431 into the vessel 446 if a suction force acts on the space within the vessel 446 through the suction opening 453 of the dispensing plate 427. At the same time the channel DV4 of the dispensing valve DV connects in its new position the dispensing head passage P1 leading from the compressor to the vent DV5 of the casing permitting the air from the compressor to be discharged through the atmosphere while suction is applied to the milk discharge ducts 431, 433 connected by the valve channel DV3.

The passage P3 leading to the control cylinder 461 is connected through air pipe SP and air filter 488 to the suction inlet of the air pump 470, causing the suction force applied by the air pump to pull the control piston 462 from its inward position in which it is held by the spring 466 to its forward position, and to rotate by the engagement of the piston rod 464 with the valve arms 437, 478, to rotate the valves DV and CV by an angle required to change the various connections established by the two valves from the agitation position to the dispensing position. A vent passage to the atmosphere, for instance, passage P4 through the rod 464, prevents creation of suction in the space of the control cylinder 461 opposite the spring during its forward movement.

The suction force exercised by the pump 470 is controlled by a normally open vent passage 491 leading from the forward side of the control cylinder 461 to the atmosphere, a plunger 492 operated by a rod 493 serving to close the vent opening 491 when brought to the upper dotted line position 492' by means of a bell crank lever 494 actuated by a push rod 495 having an actuating button 496 which is pressed inwardly when the receiving vessel 446 is placed on the holder 445 for receiving milk. The upward movement of the actuating rod 493 also controls the mercury switch 472 lifting it up to a position in which it closes the energizing circuit to the motor 471 if the lever 494 is swung upwardly by pressing against the dispensing button 496 of the device.

Under normal operating conditions the several parts are arranged in the way shown in Fig. 11, there being no vessel between the holder 445 and the dispensing plate 427. The clock actuated contacts 475 are periodically closed and the motor is periodically energized causing the pump to operate for about 10 seconds every 5 or 6 minutes. Each time the pump operates it draws in air by way of the opening leading from the atmosphere through the open vent passage 491 into the control cylinder 461 and therefrom through passage P3, suction pipe SP, air filter 488 into the suction side of the air pump 470, compressing the air and discharging it under pressure through the compression pipe CP, passage P2, filter compartment 480, passage P1, valve channel DV2, through the milk discharge duct 443 and the milk tube 239 into the bottom 240 of the can, stirring up the milk in the can 211 and agitating it as in the prior embodiments of the invention. This agitation is periodically repeated to maintain at all times uniform consistency of the milk.

To dispense the milk from the can into the vessel 446, the vessel is placed on the holder 445 and brought into engagement with the sealing ring of the dispensing plate 427. In placing the vessel on the holder, the push button 496 is pressed inwardly against the pedestal rotating the lever 494 and lifting the rod 493 which closes by means of the switch 472 the circuit of the pump motor 471 and by plunger 492 the air inlet 491 into the control cylinder 461. Suction of the pump 470 now acting through the suction pipe SP and the branch of the passage P3 leading to the space 461 pulls the control piston 462 from its inward position against the action of the spring 466 and causes the piston rod 464 to rotate the two valve arms 437 and 469 till the two valves DV and CV are rotated to the position where milk discharge duct 431 is connected over valve channel DV3 to the suction duct 433 and the suction pipe SP of the pump is connected through the valve channel CV1 with the passage P5 leading to the upper space of the suction cylinder 451. The suction force now acts not only on the piston 462 of the control cylinder 461 which is held in its inward position, but also on the suction piston 455 which is now lifted in upward direction producing suction in the space below the piston 445 and exercising through the ducts 452 and 453 over the space of the receiving vessel 446 a suction force through the interconnected milk flow ducts 431, 433 and 239, lifting the milk into the discharge duct 431 and discharging it into the vessel 446.

The flow of milk from the can 211 into the vessel 446 continues until the suction piston 455 reaches a position in which its tripping rod 457 trips the vent valve V3 and opens the space on the upper side of the suction piston 455 to the atmosphere releasing the suction. This stops instantaneously the milk flow, and the milk vessel 446 may be removed from its seat on the holder 445. The amount of milk dispensed by the device may be readily controlled by the length of the movement of the suction piston 455 in the cylinder 451 and this length may be adjusted to any predetermined value by varying the length of the tripping rod 457 of the piston 455 or by adjustably mounting the actuating pin 458 at different heights of the rod 457.

The action of the piston 455 in producing the suction force for lifting the milk and returning to its downward position may be additionally controlled by means of a tiny bleeding duct 498 through the piston.

The features of the invention are not limited to the details of construction referred to hereinabove in describing various exemplifications thereof, but are applicable to devices for dispensing other liquids that will suggest themselves to those skilled in the art. The term "emulsion-like liquid" as used herein is intended to include liquids containing separable substances which tend to separate from the liquid and require substantial agitation of the liquid for maintaining consistency of the liquid, and it is accordingly desired that the appended claims be given a broad construction commensurate with the scope of the invention.

We claim:

1. In a device for dispensing an emulsion-like liquid from a container, a dispensing member having a discharge duct with a discharge opening for discharging liquid from said container through said opening, operating means including a gaseous energy source, and control means for applying energy from said source to produce a discharge of liquid from said container through said discharge duct into said discharge opening or a discharge of gas through said discharge duct into said liquid, said gaseous energy source being proportioned to deliver gas of sufficiently large energy and said duct having sufficiently low flow resistance for producing with the gas discharged into said liquid an agitating motion required to distribute substantially uniformly within said liquid separable substances contained in said liquid.

2. In a device for dispensing from a container a liquid containing a separable substance uniformly suspended in said liquid, a dispensing member having a discharge duct with a discharge opening for discharging liquid from said container, operating means including a gaseous energy source having a gas discharge passage for applying energy from said source to produce a discharge of gas into said liquid and for discharging liquid from said container through said discharge duct into said discharge opening, means for actuating said operating means to produce at periodic intervals a discharge of gas into said liquid, said gaseous energy source being proportioned to deliver gas of sufficient energy and said gas passage having sufficiently low flow resistance for producing with the discharged gas an agitating motion of the liquid required to distribute said separable substance substantially uniformly within said liquid and control means for actuating said operating means to produce a discharge of liquid from said container.

3. In a device for dispensing from a container a liquid containing a separable substance suspended uniformly in said liquid, a dispensing member having a discharge duct extending from the lower level of said container with a discharge opening for discharging liquid from said container, operating means including a gaseous energy source having a gas discharge passage for applying energy from said source to produce a discharge of gas into said liquid and for discharging liquid from said container through said discharge duct into said discharge opening, and control means for actuating said operating means to produce a discharge of liquid from said container and a discharge of gas into the liquid of said container in predetermined relation to the discharge of liquid from said container, said gaseous energy source being proportioned to deliver gas of sufficient energy and said gas passage having sufficiently low flow resistance for producing with the discharged gas an agitating motion of the liquid required to distribute said separable substance substantially uniformly within said liquid.

4. In a device for dispensing from a container a liquid containing a separable substance uniformly suspended in said liquid, a dispensing member having a discharge duct with a discharge opening for discharging liquid from said container, operating means including a gaseous energy source having a gas discharge passage for applying energy from said source to produce a discharge of gas into said liquid and for discharging liquid from said container through said discharge duct into said discharge opening, means for actuating said operating means to produce at periodic intervals a discharge of gas into said liquid, and independent control means for actuating said operating means to produce a discharge of liquid from said container and a discharge of gas into the liquid of said container in predetermined relation to the discharge of liquid from said container, said gaseous energy source being proportioned to deliver gas of sufficient energy and said gas passage having sufficiently low flow resistance for producing with the discharged gas an agitating motion of the liquid required to distribute said separable substance substantially uniformly within said liquid.

5. In a device for dispensing an emulsion-like liquid from a container, a container for said liquid having removable enclosing means forming a compartment adjoining the liquid holding space thereof, a dispensing member having a straight downwardly directed discharge duct with a discharge opening for discharging liquid from said container through said opening, a straight downwardly directed supply duct joined to said discharge duct for delivering liquid from a lower level in said container to said discharge duct, said ducts having an accessible junction portion for exposing the interior passages of said ducts, said dispensing member being shaped to permit movement thereof between a position inside said compartment to an elevated position above said compartment for discharging liquid from said container, and coupling means detachably interfitting with said dispensing member for establishing operative connections between said operating means and said dispensing member in dispensing position.

6. In a device for dispensing an emulsion-like liquid from a container, a container for said liquid having removable enclosing means forming a compartment adjoining the liquid holding space thereof, a dispensing member having a straight downwardly directed discharge duct with a discharge opening for discharging liquid from said container through said opening, a straight downwardly directed supply duct joined to said discharge duct for delivering liquid from a lower level in said container to said discharge duct, said ducts having an accessible junction portion for exposing the interior passages of said ducts, said dispensing member being shaped to permit movement thereof between a position inside said compartment to an elevated position above said compartment for discharging liquid from said container, said supply duct being slidably mounted in said cover and having a tubular extension to the bottom portion of said container, and coupling means detachably interfitting with said dispensing member for establishing operative connections between said operating means and said dispensing member in dispensing position.

7. In a device for dispensing from a container a liquid containing a separable substance suspended uniformly in said liquid, a dispensing member having a discharge duct extending from the lower level of said container with a discharge opening for discharging liquid from said container, operating means including a gaseous energy source having a gas discharge passage for applying energy from said source to produce a discharge of gas into said liquid and for discharging liquid from said container through said discharge duct into said discharge opening, and control means for actuating said operating means to produce a discharge of liquid from said container and a discharge of gas into the liquid of said container in advance of the discharge of liquid from said container, said gaseous energy source being proportioned to deliver gas of sufficient energy and said gas passage having sufficiently low flow resistance for producing with the discharged gas an agitating motion of the liquid required to distribute said separable substance substantially uniformly within said liquid.

8. In a device for dispensing an emulsion-like liquid from a container, a container for said liquid having removable enclosing means forming a compartment adjoining the liquid holding space thereof, a dispensing member having a discharge duct with a discharge opening, a supply duct joined to said discharge duct for delivering liquid from a lower level in said container to said discharge duct, operating means including a gaseous energy source, means for applying energy from said source to produce a discharge of liquid from said container through said discharge duct into said discharge opening or a discharge of gas through said discharge duct into said liquid, said dispensing member being shaped to permit movement thereof between a position inside said compartment to an elevated position above said compartment for discharging liquid from said container, and coupling means detachably interfitting with said dispensing member for establishing operative connections between said operating means and said dispensing member in dispensing position.

9. In a device for dispensing an emulsion-like liquid from a container, a container for said liquid having removable enclosing means forming a compartment adjoining the liquid holding space thereof, a dispensing member having a straight downwardly directed discharge duct with a discharge opening for discharging liquid from said container through said opening, a straight downwardly directed supply duct joined to said discharge duct for delivering liquid from a lower level in said container to said discharge duct, said ducts having an accessible junction portion for exposing the interior passages of said ducts, said dispensing member being shaped to permit movement thereof between a position inside said compartment to an elevated position above said compartment for discharging liquid from said container, operating means including a gaseous energy source, and means for applying energy from said source to produce a discharge of gas through said discharge duct into said liquid or a discharge of liquid from said container through said discharge duct into said discharge opening, and coupling means detachably interfitting with said dispensing member for establishing operative connections between said operating means and said dispensing member in dispensing position.

10. In a device for dispensing an emulsion-like liquid from a container, a dispensing member having a discharge duct with a discharge opening for discharging liquid from said container through said opening, operating means including a gaseous energy source, and means for applying energy from said source to produce a discharge of gas through said discharge duct into said liquid and a discharge of liquid from said container through said discharge duct into said discharge opening, means for actuating said operating means to produce a discharge of liquid from said container into said discharge opening, and means for producing a discharge of gas into the liquid of said container in predetermined relation to the discharge of liquid from said container.

11. In a device for dispensing from a container a liquid containing a separable substance uniformly suspended in said liquid, a dispensing member having a discharge duct extending from the lower level of said container with a discharge opening for discharging liquid from said container, operating means including a gaseous energy source having a gas discharge passage for applying energy from said source to produce a discharge of gas into said liquid and for discharging liquid from said container through said discharge duct into said discharge opening, and control means for actuating said operating means to produce a discharge of liquid from said container and a discharge of gas into the liquid of said container following the discharge of liquid from said container, said gaseous energy source being proportioned to deliver gas of sufficient energy and said gas passage having sufficiently low flow resistance for producing with the discharged gas an agitating motion of the liquid required to distribute said separable substance substantially uniformly within said liquid.

12. In a device for dispensing from a container a liquid containing a separable substance uniformly suspended in said liquid, a container for said liquid having removable enclosing means forming a compartment adjoining the liquid holding space thereof, a dispensing member having a discharge duct extending from the lower level of said container with a discharge opening for discharging liquid from said container, said dispensing member being shaped to permit movement thereof between a position inside said compartment to an elevated position above said compartment for discharging liquid from said container, operating means including a gaseous energy source having a gas discharge passage for applying energy from said source to produce a discharge of gas into said liquid and for discharging liquid from said container through said discharge duct into said discharge opening, means for actuating said operating means to produce a discharge of gas into said liquid, said gaseous energy source being proportioned to deliver gas of sufficient energy and said gas passage having sufficiently low flow resistance for producing with the discharged gas an agitating motion of the liquid required to distribute said separable substance substantially uniformly within said liquid, and control means for actuating said operating means to produce a discharge of liquid from said container.

13. In a device for dispensing from a container a liquid containing a separable substance suspended uniformly in said liquid, a container for said liquid having removable enclosing means forming a compartment adjoining the liquid holding space thereof, a dispensing member having a discharge duct extending from the lower level of said container with a discharge opening for discharging liquid from said container, said dispensing member being shaped to permit movement thereof between a position inside said compartment to an elevated position above said compartment for discharging liquid from said container, operating means including a gaseous energy source having a gas discharge passage for applying energy from said source to produce a discharge of gas into said liquid and for discharging liquid from said container through said discharge duct into said discharge opening, means for actuating said operating means to produce at periodic intervals a discharge of gas into said liquid, and control means for actuating said operating means to produce a discharge of liquid from said container, said gaseous energy source being proportioned to deliver gas of sufficient energy and said gas passage having sufficiently low flow resistance for producing with the discharged gas an agitating motion of the liquid required to distribute said separable substance substantially uniformly within said liquid.

14. In a device for dispensing an emulsion-like liquid from a container, a dispensing member having a discharge duct with a discharge opening for discharging liquid from said container through said opening, operating means including a gaseous energy source, means for applying energy from said source to produce a discharge of gas through said discharge duct into said liquid and a discharge of liquid from said container through said discharge duct into said discharge opening, periodically actuated means for causing said operating means to produce at periodical intervals a flow of gas into said liquid to agitate said liquid, and means for independently actuating said operating means to produce a discharge of liquid from said container into said discharge opening.

15. In a device for dispensing an emulsion-like liquid from a container, a dispensing member having a discharge duct with a discharge opening for discharging liquid from said container through said opening, operating means including a gaseous energy source, means for applying energy from said source to produce a discharge of gas through said discharge duct into said liquid and a discharge of liquid from said container through said discharge duct into said discharge opening, means for actuating said operating means to produce a discharge of liquid from said container into said discharge opening, and cut-off means actuated at a predetermined stage of the discharge of the liquid from the discharge duct for stopping said flow of liquid.

16. In a device for dispensing from a container a liquid containing a separable substance suspended uniformly in said liquid, a dispensing member having a discharge duct extending from the lower level of said container with a discharge opening for discharging liquid from said container, operating means including a gaseous energy source having a gas discharge passage for applying energy from said source to produce a discharge of gas into said liquid and for discharging liquid from said container through said discharge duct into said discharge opening, control means for actuating said operating means to produce a discharge of liquid from said container, means for actuating said operating means to produce a discharge of gas into said liquid, said gaseous energy source being proportioned to deliver gas of sufficient energy and said gas passage having sufficiently low flow resistance for producing with the discharged gas an agitating motion of the liquid required to distribute said separable substance substantially uniformly within said liquid, and cut-off means actuated at a predetermined stage of the discharge of the liquid from the discharge duct for stopping said flow of liquid.

17. In a device for dispensing an emulsion-like liquid from a container, a dispensing member having a discharge duct with a discharge opening for discharging liquid from said container through said opening, operating means including a gaseous energy source, valve means movable between a position establishing an agitation passage for producing with energy from said source a discharge of gas through said discharge duct into said liquid and a position establishing a dispensing passage for producing with energy from said source a discharge of liquid through said discharge duct into said opening, means for actuating said operating means to produce a discharge of liquid from said container into said discharge opening, and means for producing a discharge of gas into the liquid of said container in predetermined relation to the discharge of liquid from said container.

18. In a device for dispensing an emulsion-like liquid from a container, a dispensing member having a discharge duct with a discharge opening for discharging liquid from said container through said opening, operating means including a gaseous energy source, valve means movable between a position establishing an agitation passage for producing with energy from said source a discharge of gas through said discharge duct into said liquid and a position establishing a dispensing passage for producing with energy from said source a discharge of liquid through said discharge duct into said opening, periodically actuated means for causing said operating means to produce at periodical intervals a flow of gas into said liquid to agitate said liquid, and means for independently actuating said operating means to produce a discharge of liquid from said container into said discharge opening.

19. In a device for dispensing an emulsion-like liquid from a container, a dispensing member having a discharge duct with a discharge opening for discharging liquid from said container through said opening, operating means including a gaseous energy source, valve means movable between a position establishing an agitation passage for producing with energy from said source a discharge of gas through said discharge duct into said liquid and a position establishing a dispensing passage for producing with energy from said source a discharge of liquid through said discharge duct into said opening, means for actuating said operating means to produce a discharge of liquid from said container into said discharge opening, and cut-off means actuated at a predetermined stage of the discharge of the liquid from the discharge duct for stopping said flow of liquid.

20. In a device for dispensing an emulsion-like liquid from a container, a dispensing member having a discharge duct with a discharge opening for discharging liquid from said container through said opening, operating means including a gaseous energy source, valve means movable between a position establishing an agitation passage for producing with energy from said source a discharge of gas through said discharge duct into said liquid and a position establishing a dispensing passage for producing with energy from said source a discharge of liquid through said discharge duct into said opening, periodically actuated means for causing said operating means to produce at periodical intervals a flow of gas into said liquid to agitate said liquid, means for actuating said operating means to produce a discharge of liquid from said container into said discharge opening, and cut-off means actuated at a predetermined stage of the discharge of the liquid from the discharge duct for stopping said flow of liquid.

WILLIAM TAMMINGA.
OTTORINO BONOMI.
ROBERT E. CORRADINI.